Oct. 22, 1957    A. L. CULLEN    2,810,884
MICROWAVE WATTMETERS
Filed Oct. 12, 1955

INVENTOR
A. L. CULLEN

United States Patent Office 2,810,884
Patented Oct. 22, 1957

2,810,884

MICROWAVE WATTMETERS

Alexander Lamb Cullen, London, England, assignor to Wayne Kerr Laboratories Limited, New Malden, England, a British company Application October 12, 1955, Serial No. 540,097

14 Claims. (Cl. 324—95)

This invention relates to microwave wattmeters for measuring the flow of power through a waveguide.

It is known to measure the flow of power through a waveguide by suspending in the guide, on a torsion fibre, a metal vane with its plane at 45 degrees to the electric field, the suspension being such that the vane can twist into the plane of the electric field. Such a wattmeter is described in Monograph No. 42 of the Institution of Electrical Engineers entitled "A Torque-Operated Wattmeter for 3-cm. Microwaves." As explained in that Monograph and in Monograph No. 24 of the Institution of Electrical Engineers entitled "A General Method for the Absolute Measurement of Microwave Power," the torque on such a vane in a waveguide is dependent on the power flow through the waveguide. This form of wattmeter can be calibrated by means of experiments not involving any other standards of power and hence forms an absolute measurement of microwave power. With the form of wattmeter described in the first-mentioned of the above monographs, however, any power measurement would be affected by standing waves in the waveguide and hence, in order to measure power with that form of wattmeter, it is essential that the waveguide should be accurately matched to its output so as to prevent any possibility of standing waves. It is one of the objects of the present invention to provide an improved form of wattmeter in which the calibration will be substantially independent of the standing wave ratio in the waveguide transmission system.

According to this invention a microwave wattmeter comprises a length of waveguide having a vertical section in which a pair of rigidly-connected similar co-planar vanes are suspended by a torsion fibre with their effective centres spaced a quarter of a guide wavelength apart along the length of said vertical section. With this construction, if there is any standing wave in the waveguide, the individual torques on the two vanes will differ but the total torque of the two combined is substantially independent of the standing wave ratio.

The two vanes are suspended by a torsion fibre in a vertical section of the waveguide in order that their torques can be combined. In a preferred form of construction, a microwave wattmeter comprises a length of waveguide having a vertical section with bends at either end thereof, a pair of rigidly-connected similar co-planar vanes mounted on a straight supporting rod with their effective centres spaced apart a quarter of a guide wavelength along the length of said vertical section, said supporting rod being arranged axially of said vertical section and extending through the waveguide walls at said bends, and a torsion fibre from which said supporting rod is suspended. By having two bends in a waveguide in this manner the vane assembly may be supported outside the waveguide. Furthermore a mirror may be conveniently arranged on the lower end of said supporting rod outside the waveguide for indicating angular movement of the vanes.

Preferably the waveguide has right-angled bends at either end of the vertical section and conveniently these two right-angled bends are in opposite directions so that the waveguide has parallel input and output portions in which the direction of transmission is the same. By this arrangement the wattmeter can be inserted in a horizontal waveguide run with only a slight difference in level between the input and output guides.

The waveguide may be of any cross section but it is desirable that its dimensions should be so chosen in relation to the operating waveguide length that only the dominant mode is propagated. The vanes would have to be suspended so that they are at 45 degrees to the electric field in order to obtain the maximum torque. Generally it is convenient to use a rectangular waveguide and such a guide may be used with horizontal portions having their broad faces in horizontal planes, the horizontal portions being joined by a short vertical section in which the vane assembly is suspended. In such a rectangular waveguide the electric field would be in a vertical direction in the horizontal portions of the waveguide. In the vertical portion of the waveguide the field will have a horizontal component parallel to the axis of the horizontal portions. The vanes would, therefore, be suspended at 45 degrees to the axis of the horizontal portions of the waveguide. The torsion fibre suspension will permit the vanes to rotate about a vertical axis and the torque on the vanes will be a measure of the power flow through the guide.

It will be seen that the arrangement described above using a waveguide of rectangular section is used with two right-angle bends as described above, the horizontal portions having their broad faces in horizontal planes is suitable for direct connection to waveguide systems in which, as is the common practice, rectangular waveguides are arranged in horizontal runs with their broad faces in horizontal planes. This arrangement eliminates any need for twisted waveguide sections or multiple bends such as are required in the construction described in the first of the aforementioned monographs in which the rectangular waveguide must have its broad faces in vertical planes.

Preferably there is provided a torsion head for twisting the upper end of the torsion fibre whereby, after the vanes have been deflected, a measured torque may be applied to restore them to their original position. In one method of using such an instrument the vanes are set at 45 degrees to the axis of the horizontal portions of the waveguide before the power is switched on and, in a construction having a mirror as described above, the position of the spot of light reflected from the mirror is noted, the power is then switched on and the torsion head is turned to rotate the vanes and the mirror until the spot of light is brought back to its original position. The angular rotation of the torsion head may be measured on a scale and this rotation is a measure of the torque required to restore the vanes to their original position and hence is a measure of the power flow through the waveguide. Alternatively instead of measuring the angular movement of the torsion head, the torsion head could be twisted back until the vanes are in their original position and the power flow through the waveguide then switched off; the deflection of the spot of light would then be a measure of the torque on the vanes and hence of the power flow. It is generally undesirable to measure the torque directly by measuring the deflection of the vanes when the power is switched on since the movement of the vanes from their original position may upset the matching of the wattmeter. The wattmeter is preferably arranged so as not to introduce any mismatch when the vanes are at 45 degrees to the electric field and, by restoring the vanes to this position, as described above, no mismatch is introduced in the use of the instrument. Although the wattmeter can be used in a waveguide system having a standing wave, it is undesirable that the vanes themselves should introduce mismatches since this might affect the accuracy of the instrument. Conveniently the waveguide bends may be constructed so that any reflection of incident waves at the bends compensates for reflections at the vanes when the vanes are at 45 degrees to the electric field. However, matching means, for example inductive or capacitive diaphragms or matching screws may be provided at one or both bends.

Fuid damping means may be provided for damping the vane assembly.

Each vane may comprise a metal plate, for example a sheet of aluminum foil or it may comprise a wire structure. In this latter case the wires are arranged to extend in a direction so as to be rotatable into the direction of the electric field.

The following is a description of one embodiment of the invention reference being made to the accompanying drawings in which.

Figure 1:
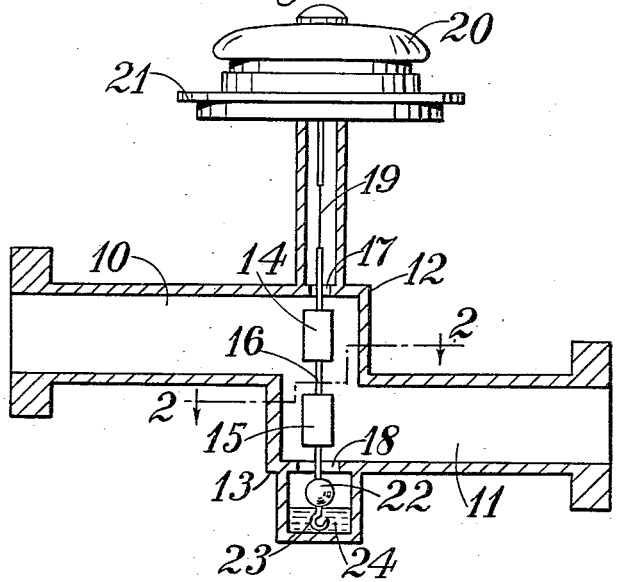
Figure 1 is a diagrammatic vertical section through a wattmeter.
Figure 2:
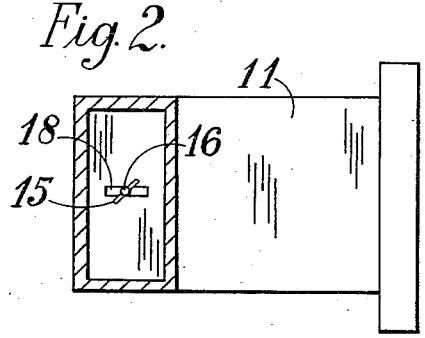
Figure 2 is a horizontal section along the line 2—2 of Figure 1.

Referring to the drawings there is shown a wattmeter having an input waveguide 10 of rectangular section and an output waveguide 11 of similar section, the output guide being slightly below the level of the input guide and joined thereto by a vertical section formed by two right-angled bends 12, 13. Suspended in the vertical section is a vane assembly comprising two rectangular vanes 14, 15 which are mounted on a supporting rod 16. The vanes are formed of thin metal foil and the supporting rod 16 is preferably (although not necessarily) formed of insulating material. The upper end of the supporting rod 16 extends through a small opening 17 in the upper wall of the input waveguide 10 and the lower end of the supporting rod extends through a similar small opening 18 in the lower wall of the output guide 11. The vane assembly is suspended by means of a torsion fibre 19, the upper end of which is secured to a torsion head 20 by means of which the upper end of the fibre 19 may be rotated. This torsion head (which is shown in elevation and not in section) has a slow-motion drive and is provided with a scale 21 by means of which the angle through which the torsion head is turned may be measured.

On the lower end of the supporting rod 16 outside the waveguide is a mirror 22 and below this mirror the rod 16 is bent round into a hook or loop 23 which is immersed in a fluid to form a dashpot 24 for damping movement of the vane assembly. Angular movement of the vane assembly is indicated by means of the mirror 22 in cooperation with a projection lamp and scale in the known manner.

It is found that in a construction such as is shown in the drawings, the reflection of incident waves at each of the bends 12 and 13 is almost exactly cancelled by the reflections at the adjacent vanes 14, 15 when the vanes make an angle of 45 degrees with a plane containing the propagation vector of a wave travelling through the waveguide. However, additional compensation could be provided by inductive or capacitive diaphragms or by matching screws if necessary. Adjustable matching means may be desirable if the wattmeter is to be used for measuring different ranges of power by means of interchangeable vane assemblies.

In order to make the instrument readily portable, a lifting and clamping mechanism (not shown) may be provided for relieving the torsion fibre 19 of the weight of the vane and mirror assembly when the instrument is not in use.

The calibration of the instrument for absolute power measurement is effected in two stages; firstly the constant of proportionality between power and torque is determined and secondly the constant of proportionality between torque and angular deflection is measured. The former is determined in the manner described in the above-mentioned Monograph No. 24 and the latter is determined my measuring the periodic time of the system when the movement is loaded with various rods of known moment of inertia.

I claim:

1. A microwave wattmeter comprising a length of waveguide having a vertical section in which a pair of rigidly-connected similar co-planar electrically conductive vanes are suspended by a torsion fibre with their effective centres spaced a quarter of a guide wavelength apart along the length of said vertical section.

2. A microwave wattmeter comprising a length of waveguide having a vertical section with bends at either end thereof, a pair of rigidly-connected similar co-planar electrically conductive vanes mounted on a straight supporting rod with their effective centres spaced apart a quarter of a guide wavelength along the length of said vertical section, said supporting rod being arranged axially of said vertical section and extending through the waveguide walls at said bends, and a torsion fibre from which said supporting rod is suspended.

3. A microwave wattmeter as claimed in claim 2 wherein a mirror is provided on the lower end of said supporting rod outside the waveguide for indicating angular movement of the vanes.

4. A microwave wattmeter as claimed in claim 2 wherein fluid damping means are provided for damping the movement of the vane assembly.

5. A microwave wattmeter as claimed in claim 2 wherein there is provided a torsion head for twisting the upper end of the torsion fibre whereby, after the vanes have been deflected, the torque required to restore them to their original position may be measured.

6. A microwave wattmeter as claimed in claim 2 wherein each vane comprises a metal plate.

7. A microwave wattmeter as claimed in claim 2 wherein each vane comprises a wire structure.

8. A microwave wattmeter as claimed in claim 2 wherein said waveguide is of rectangular cross-section and comprises two horizontal stretches joined by a vertical stretch, the horizontal stretches being arranged with their broad faces in horizontal planes.

9. A microwave wattmeter comprising a length of waveguide having a vertical section with right-angle bends at either end thereof so that the waveguide has parallel input and output portions in which the direction of transmission is the same, a pair of rigidly-connected co-planar electrically-conductive vanes mounted in a straight supporting rod with their effective centers spaced apart a quarter of a guide wavelength along the length of said vertical section, said supporting rod being arranged axially of said vertical section and extending through the waveguide walls at said bends, and a torsion fibre from which said supporting rod is suspended.

10. A microwave wattmeter as claimed in claim 9 wherein the waveguide bends are constructed so that any reflection of incident waves at the bends compensates for reflection at the vanes.

11. A microwave wattmeter as claimed in claim 9 wherein matching means are provided at both bends.

12. A microwave wattmeter comprising a length of waveguide having a vertical section with right angle bends at either end thereof so that the waveguide has parallel input and output portions; a pair of rigidly-connected co-planar electrically conductive vanes mounted on a straight supporting rod with their effective centers spaced apart a quarter of a guide wavelength along the length of said vertical section, said supporting rod being arranged axially of said vertical section and extending through the waveguide walls at said bends, a torsion fibre from the lower end of which said rod is suspended; a support for the upper end of said torsion fibre rotatably mounted with respect to the waveguide for turning about the axis of said fibre whereby, after the vanes have been deflected, a restoring torque may be applied to them and indicating means for indicating when said supporting rod is in a predetermined angular position.

13. A microwave wattmeter as claimed in claim 12 wherein said indicating means comprises a mirror attached to said rod with its plane parallel to the axis of the rod.

14. A microwave wattmeter as claimed in claim 12 wherein said waveguide is of rectangular cross-section and comprises two horizontal stretches joined by a vertical stretch, the horizontal stretches being arranged with their broad faces in horizontal planes.

References Cited in the file of this patent

UNITED STATES PATENTS

| | | |
|---|---|---|
| 2,427,100 | Kihn | Sept. 9, 1947 |
| 2,458,565 | Cork | Jan. 11, 1949 |

FOREIGN PATENTS

| | | |
|---|---|---|
| 548,681 | Great Britain | Oct. 20, 1942 |